United States Patent [19]

Berwanger

[11] Patent Number: 5,485,902
[45] Date of Patent: Jan. 23, 1996

[54] AIRCRAFT BRAKE PISTON HYDRAULIC ADJUSTER ASSEMBLY

[75] Inventor: Fred W. Berwanger, South Bend, Ind.

[73] Assignee: AlliedSignal Inc., Morristown, N.J.

[21] Appl. No.: 286,307

[22] Filed: Aug. 5, 1994

[51] Int. Cl.⁶ .................................................. F16D 65/38
[52] U.S. Cl. ...................... 188/196 A; 188/351
[58] Field of Search ............................ 188/196 R, 196 A, 188/351, 71.7, 71.8

[56] References Cited

U.S. PATENT DOCUMENTS

| 3,033,325 | 5/1962 | Tjernstrom . | |
|---|---|---|---|
| 3,297,115 | 1/1967 | Waloen et al. . | |
| 3,581,849 | 6/1971 | Landgraf . | |
| 3,633,715 | 1/1972 | Burnett . | |
| 3,645,362 | 2/1972 | Scheibe | 188/196 A |
| 4,195,714 | 4/1980 | Massing | 188/351 |
| 4,412,603 | 11/1983 | Bischoff . | |
| 4,496,033 | 1/1985 | Hall et al. . | |
| 4,570,531 | 2/1986 | Anderson et al. . | |
| 5,072,811 | 12/1991 | Everhard . | |
| 5,273,141 | 12/1993 | Veret et al. . | |

FOREIGN PATENT DOCUMENTS

| 0292788 | 11/1988 | European Pat. Off. . | |
|---|---|---|---|
| 490978 | 3/1976 | U.S.S.R. | 188/351 |

Primary Examiner—Matthew C. Graham
Attorney, Agent, or Firm—Larry J. Palguta; Leo H. McCormick, Jr.

[57] ABSTRACT

The present invention provides a hydraulic brake piston adjuster assembly (10) that includes a first or outer piston (30) housing and a second inner piston (40). The first piston (30) has a first piston end (31) received within a housing bore (16) and the end (31) extends axially to include an inlet (32) having a relief valve mechanism (34). The second piston (40) includes an axially inner second piston end (42) received within the bore (36) of the first piston (30) and extends axially to encompass the inlet (32) of the first piston (30) and so that the piston ends (31, 42) define therebetween an inner piston chamber (50). A first piston second end abuts a running clearance adjustment mechanism (59) comprising an axially displaceable collar member (60). When hydraulic brake pressure is received within a piston housing chamber (17) of the housing bore (16), the first and second pistons (30, 40) are displaced axially outwardly of the housing bore (16) such that the collar member (60) is displaced with the first piston (30) and takes up a clearance (X). After the clearance (X) is taken up, hydraulic pressure opens the relief valve mechanism (34) to permit fluid flow into the inner piston chamber (50) and displace the second piston (40) relative to the first piston (30). Because the relief valve mechanism (34) is a unidirectional valve (34), hydraulic fluid is trapped within the inner piston chamber (50) to attain an adjusted position of the second piston (40) relative to the first piston (30).

19 Claims, 5 Drawing Sheets 5,485,902

AIRCRAFT BRAKE PISTON HYDRAULIC ADJUSTER ASSEMBLY

BACKGROUND OF THE INVENTION

The present invention relates to aircraft brake piston adjuster assemblies, and in particular to an aircraft brake piston hydraulic adjuster assembly.

External, non-concentric aircraft brake piston adjusters in multidisc aircraft brakes are located in the piston housing at positions circumferentially between the pistons, and transmit piston return loads through the first brake disc which is generally referred to as the "pressure plate". The return loads of such adjusters tend to distort the pressure plate, can decrease the uniformity of the distribution of brake actuation pressure during braking, and tend to increase heat transfer from the heat sink to the pistons because the pistons are continuously in contact with the pressure plate. Prior concentric piston adjusters are located within the pistons and retract the pistons away from the brake heat sink to thereby eliminate the disadvantages of external adjusters. Such internal concentric adjusters are anchored to the brake structure by a pin inserted in a sealed gland in the piston dome. During brake actuation, structural deformations and vibrations tend to cause internal adjuster parts to chafe and wear, which often leads to adjuster pin leakage and desultory failures of adjuster components.

It is highly desirable to provide a brake piston adjuster assembly which eliminates the adjuster pin and seal, and which comprises fewer parts and no small parts. It is preferable that as much as possible of the brake piston adjuster assembly be stationery relative to the piston housing so that it is less subject to vibrations from the heat sink. It is highly desirable to provide a brake piston adjuster assembly which automatically adjusts the return position of the brake piston as the brake friction surfaces of the discs wear. It is considered advantageous if the adjuster assembly does not include any permanently deforming parts and does not rely on mechanical friction loads, which are difficult to maintain with consistent accuracy, to obtain the adjustment feature. It is desirable that, when the landing gear is retracted and the brake is oriented vertically, the adjustment feature prevents the weight of the brake friction discs from pushing the brake piston back into the housing. It is desirable that hydraulic fluid utilized for the adjustment feature be easily released when the brake piston is reset during overhaul.

SUMMARY OF THE INVENTION

The present invention provides solutions to the above by providing a brake piston adjuster assembly, comprising a housing having therein a housing bore, a first piston disposed slidably in the bore to be extendible therefrom and including a first piston bore and a first piston end, a second piston disposed slidably within the first piston bore and including a second piston bore and a second piston end, the first piston including relief valve means disposed at an inlet of the first piston end, the second piston end adjacent said inlet and the piston ends defining therebetween an inner piston chamber, and the first piston including a second end which cooperates with a portion of the adjuster assembly comprising return stroke clearance adjustment means connected with the housing, so that fluid pressure received within said housing bore displaces the first and second pistons axially outwardly of the housing bore to operate the clearance adjustment means which terminates displacement of the first piston when the running clearance is achieved, and further fluid pressure received in the housing bore causing said relief valve means to open and permit fluid flow to the inner piston chamber and effect axial displacement of the second piston relative to the first piston.

BRIEF DESCRIPTION OF THE DRAWINGS

The invention is described in detail below with reference to the drawings which illustrate embodiments in which.

DESCRIPTION OF THE INVENTION

Figure 1:
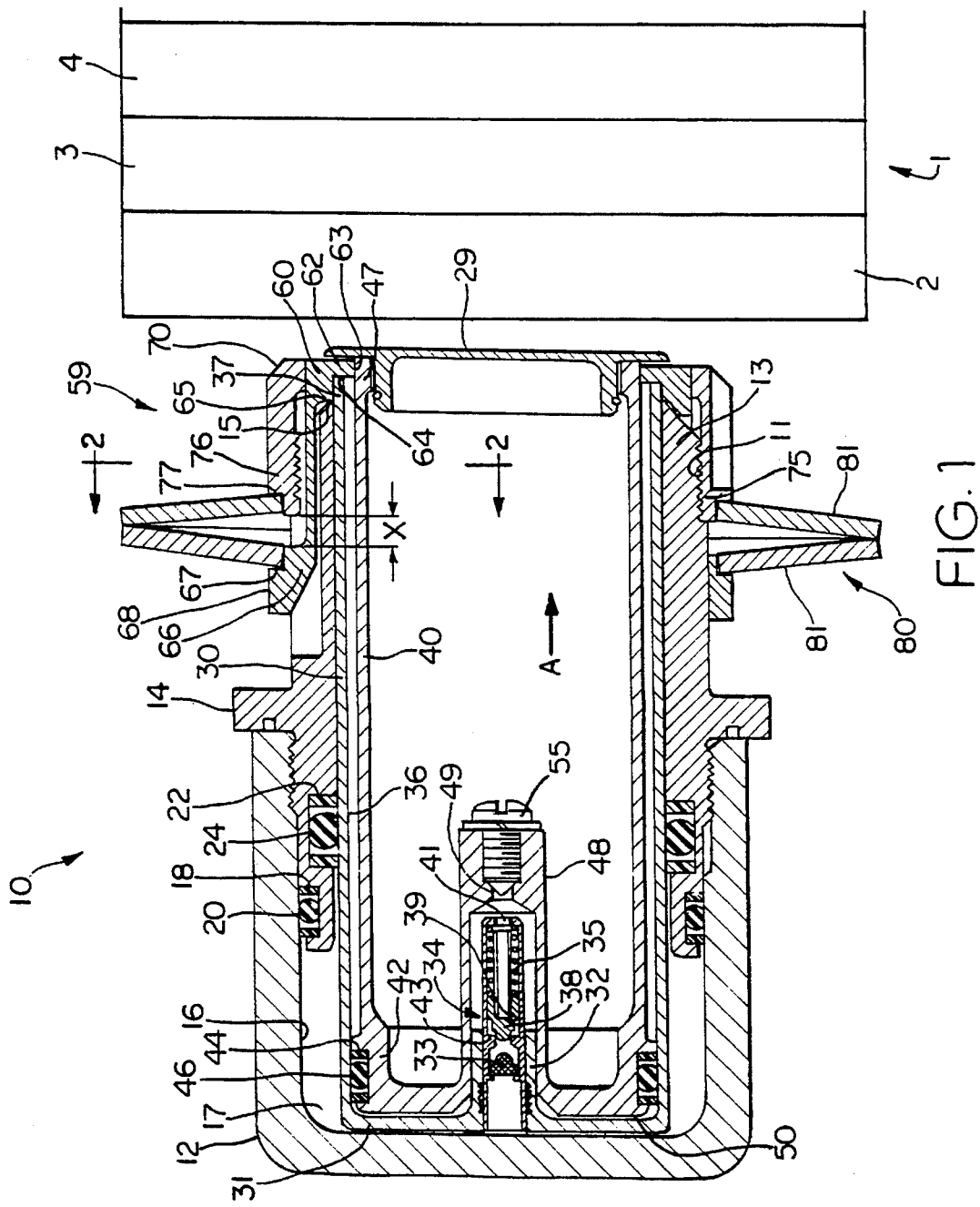
FIG. 1 is a section view of the brake piston hydraulic adjuster assembly in accordance with the present invention.
Figure 2:
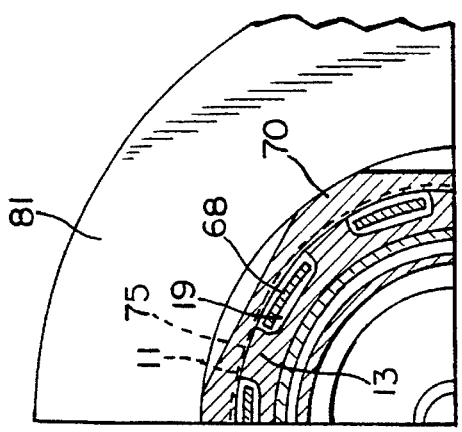
FIG. 2 is a section view taken along view line 2—2 of FIG. 1.

Referring to FIG. 1, the brake piston hydraulic adjuster assembly is designated generally by reference numeral 10. A piston housing 12 includes therein a plurality of threadedly engaged housing bushings 14 which are received within housing bores 16. Located adjacent housing 12 is a brake heat stack or heat sink 1 (illustrated schematically) which includes a pressure plate or disc 2 engaged by a piston of the assembly to effect compression of the heat stack during braking. Heat stack 1 comprises a plurality of rotors such as rotor 3 and a plurality of stators such as pressure plate 2 and stator 4. Each bushing 14 extends axially inwardly of housing bore 16 and includes an outer diameter slot 18 receiving seal assembly 20, and a radially inwardly opening slot 22 with a seal assembly 24. Seal assembly 20 engages the surface of housing bore 16 and seal assembly 24 engages the outer surface of first or outer piston 30. Outer piston 30 includes a first piston end 31 disposed within bore 16 and housing chamber 17, and piston end 31 includes an axially extending inlet 32 which houses a unidirectional or one-way relief valve means 34. First piston 30 includes a first piston bore 36 housing a second or inner piston 40. Second piston 40 includes a second piston end 42 received within first piston bore 36, and includes a radially outward opening slot 44 housing seal mechanism 46 which slidingly and sealingly engages the surface of first piston bore 36. Second piston end 42 includes an axial extension 48 which encompasses inlet 32 and relief valve means 34 so that piston ends 31, 42 define therebetween an inner piston chamber 50. Relief valve means 34 is a commercially available cartridge device interference fit with inlet 32 and includes a filter 33, spring 35 biased poppet 38 with an opening 39 for fluid flow through end opening 41. Poppet 38 abuts valve seat 43. Axial extension 48 includes an axial opening 49 within which is disposed a bleeder screw or member 55. Bleeder screw 55 is threadedly received within opening 49 to trap hydraulic fluid within chamber 50 defined between the piston ends of the first and second pistons 30 and 40. Second piston 40 includes a second exterior end 47 which extends beyond bushing 14 and first piston second end 37. Assembly 10 includes a piston return stroke clearance adjustment means 59 comprising a collar member 60 located about piston bushing 14 and including a radially inwardly extending portion 62 having an axial surface 63 engaging the outer surface of second piston 40, and a radial surface 64 engaging abuttingly the first piston second end 37. Collar member 60 also includes a radial portion 65 which abuts bushing end 15 that provides an axial stop for the axial movement of the collar member 60 in the direction toward bushing 14. Collar member 60 includes a first end 66 which comprises a plurality of axially extending fingers 68 that are received within circumferentially spaced apart bushing slots 19 (see FIG. 2). First ends 66 each include a radially inwardly stepped portion 67 which is disposed opposite from radially inwardly stepped portion 77 of nut member or means 70. Nut means 70 includes a first end 76 with an inner diameter threaded portion 75 which threadedly engages threads 11 located at the splines 13 of bushing 14, to position fixedly the nut means relative to bushing 14.

Radially inwardly stepped portions 67 and 77 receive and position respective portions of resilient means 80 comprising a disc spring having disc parts 81 biasing axially the first end of the collar member away from the nut means first end 76. Other types of springs or resilient means are suitable for use in place of the illustrated disc spring.

For clarity of the drawings, dirt exclusion devices have not been illustrated.

Figure 3:
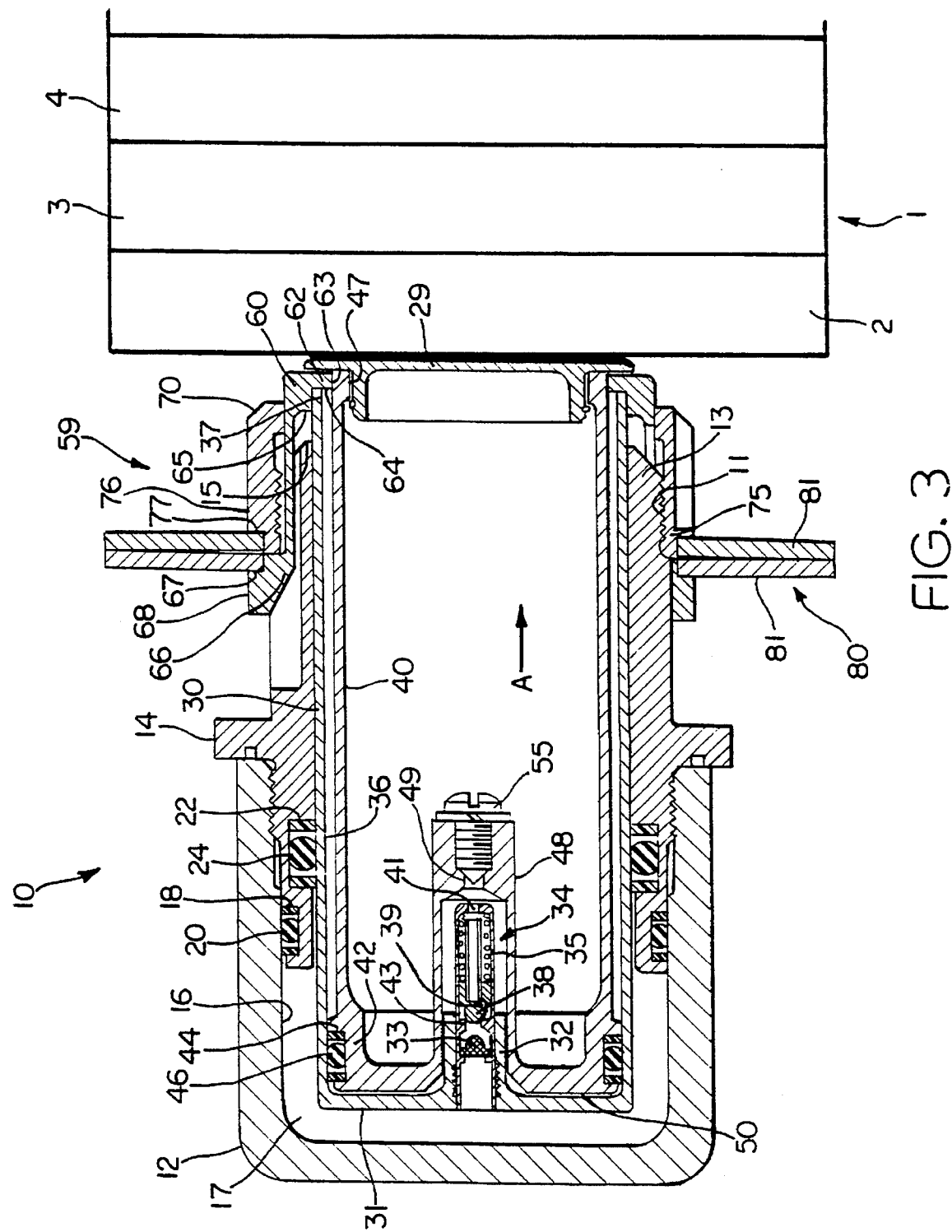
FIG. 3 is a section view of the brake piston hydraulic adjuster assembly during operation of the brake.
Figure 4:
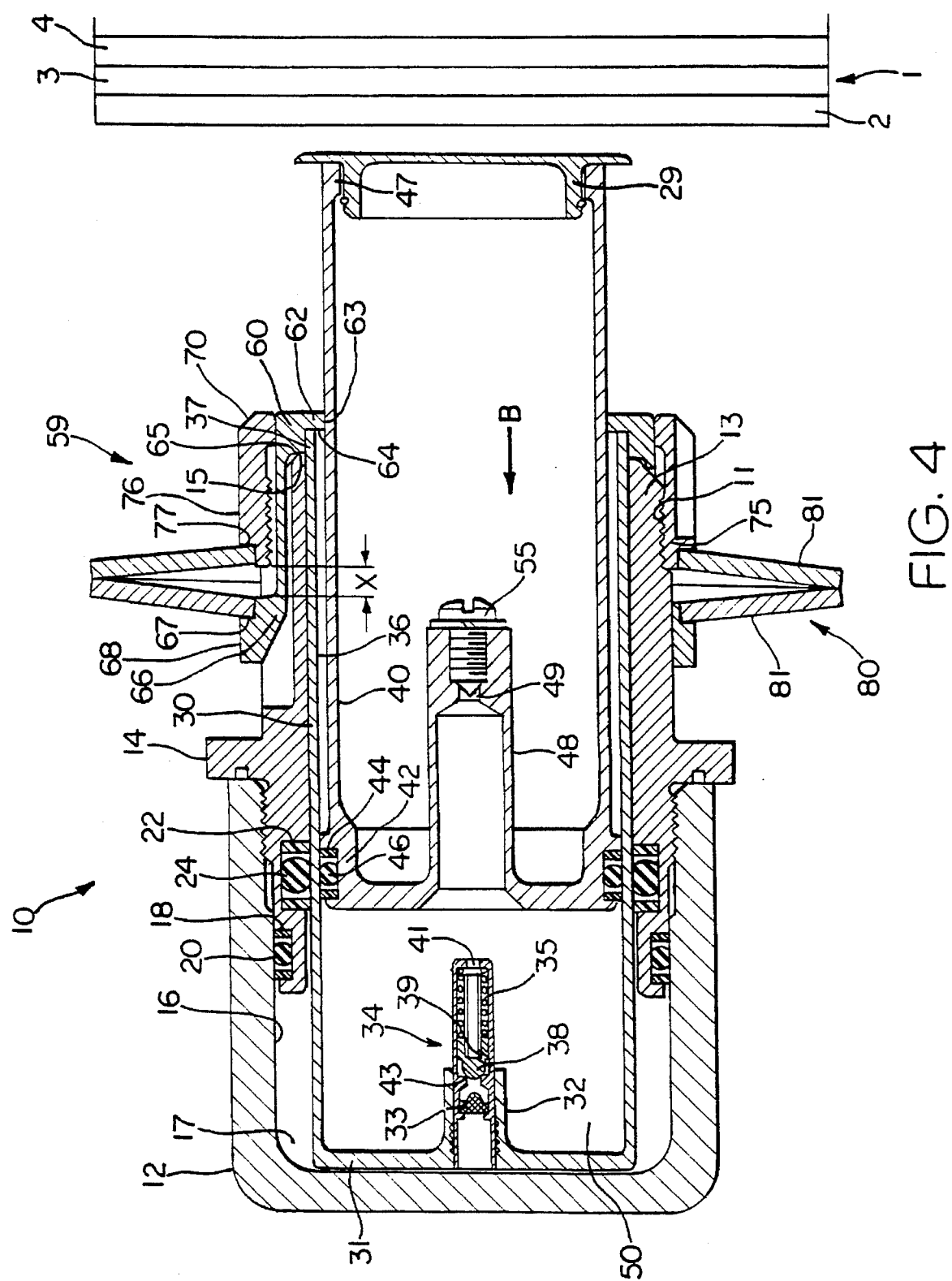
FIG. 4 is a section view of the adjuster assembly in an at-rest position and, because of the brake disc or heat sink wear, the second piston located at an adjusted position relative to the first piston.

When hydraulic brake pressure is transmitted to the housing chamber 17 of bore 16, fluid pressure is applied to first piston end 31 and causes first and second pistons 30 and 40 to be displaced axially in the direction of arrow A in FIG. 1. FIG. 1 illustrates the distance X which is the axial distance between first ends 66 and 76 of the collar member and nut means, respectfully, distance X being the piston return stroke clearance of brake assembly 10. When piston cap 29 engages the pressure plate 2 and compresses the brake stack 1 (as illustrated in FIG. 3), the clearance X has been "taken up" and the first ends 66 and 76 of the collar member and nut means engage one another. This occurs because axial displacement of first piston 30 causes displacement of the abutting collar member 60 to effect compression of the resilient means 80 as first ends 66 and 76 approach one another. In circumstances when the running clearance has been taken up and the piston cap 29 still has not compressed fully the brake stack because of wear of the heat sink 1 (for example, FIG. 3 but without full compression of the brake stack), collar 60 maintains first piston 30 in an axially stationary position while increasing brake pressure in chamber 17 relative to chamber 50 causes the one-way or unidirectional relief valve means 34 to open and permit fluid flow into the inner piston chamber 50. As fluid volume increases in chamber 50, the second piston 40 will be displaced relative to the first piston 30. The relief valve means is calibrated so that it does not allow fluid flow through the valve at pressure differentials developed only by the load of the resilient means 80. Because relief valve means 34 has opened and allows increasing hydraulic fluid pressure into chamber 50, second piston 40 is displaced axially in direction of arrow A in FIG. 3 and effects displacement of the second piston relative to the first piston so that the second piston compresses fully the stack 1. Because relief valve means 34 is a one-way or unidirectional flow valve, hydraulic fluid pressure is trapped within chamber 50 so that during the termination of braking the second piston will retain its adjusted position relative to the first piston. FIG. 4 illustrates assembly 10 in an at-rest-position after wear of the heat stack 1, and the second piston 40 has attained a significantly adjusted position relative to the first position 30. In the illustrated at-rest position, the resilient means 80 has effected the clearance X between ends 66 and 76 of the collar member 60 and nut means 70 so that the first piston is always returned to the same at-rest position as illustrated in FIGS. 1 and 4, while the second piston 40 retains its at-rest adjusted and extended position (FIG. 4) relative to first piston 30. When new brake discs for heat stack 1 are installed during overhaul, the second piston 40 is repositioned to its initial position illustrated in FIG. 1 by opening the bleeder screw 55 so that fluid within inner piston chamber 50 may be released through opening 49. The second piston 40 is pushed back in the direction of arrow B (see FIG. 4) so that it is repositioned as shown in FIG. 1, and if the piston is oriented vertically any air trapped within inner piston chamber 50 is removed with the fluid. The bleeder screw 50 may comprise a different bleeder mechanism according to the desired application. For example, if a miniature push-button bleeder is utilized, there would not be required any particular tools or parts to reposition the second piston during overhaul. The push-button bleeder would be merely depressed by hand or by any standard tool or device in order to relieve fluid from chamber 50.

Figure 6:
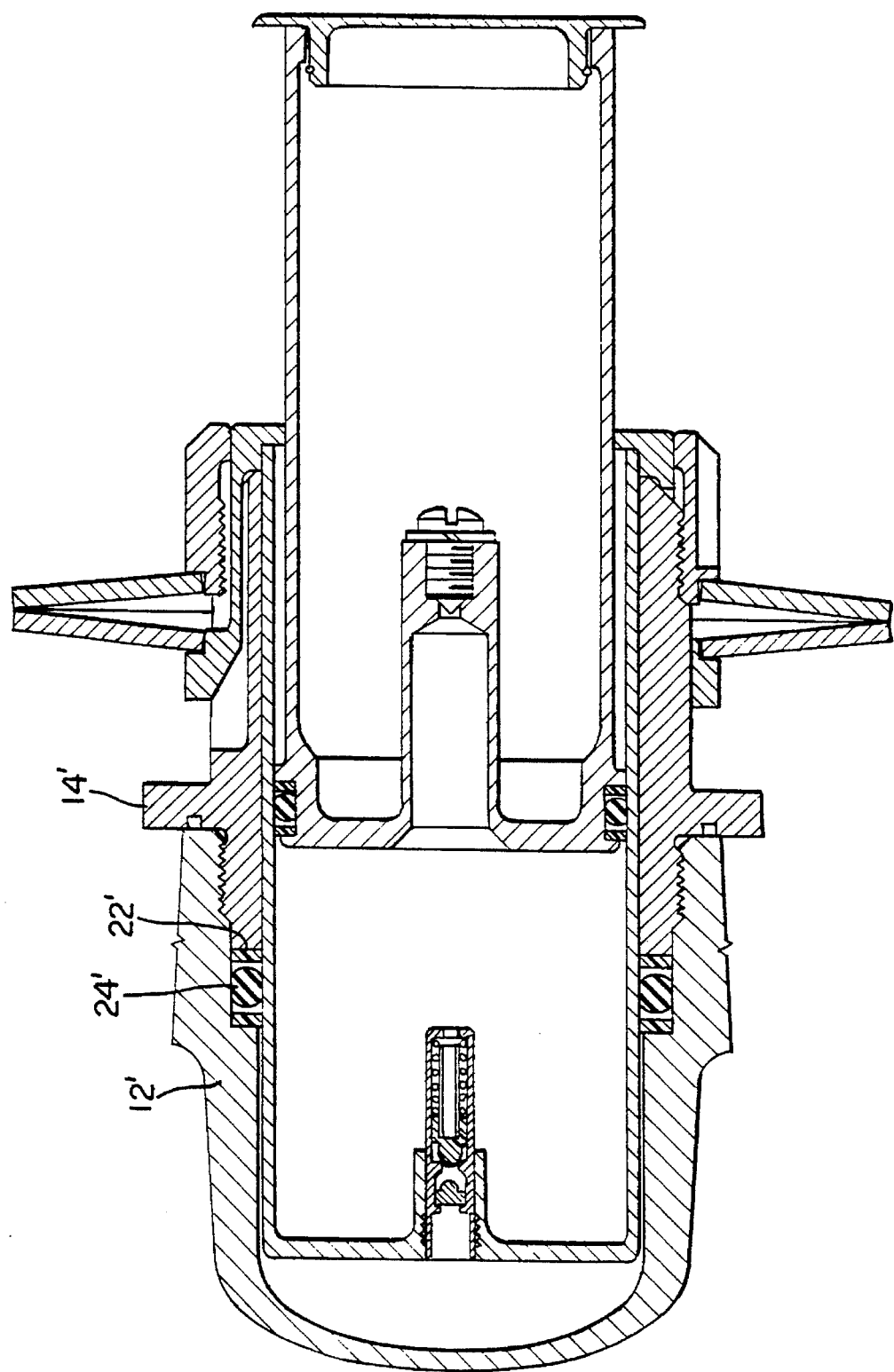
FIG. 6 is a second embodiment illustrating the use of a single, inner seal assembly.

FIG. 6 illustrates a second embodiment similar to that of FIG. 1, and the same structure is illustrated by the same reference numeral. In this embodiment, bushing 14' includes a radially extending end 22' which abuts the seal mechanism 24' that also abuts a housing wall 12'. Seal mechanism 24' provides a single seal assembly rather than the two seal assemblies 20 and 24 illustrated in FIG. 1.

Figure 5:
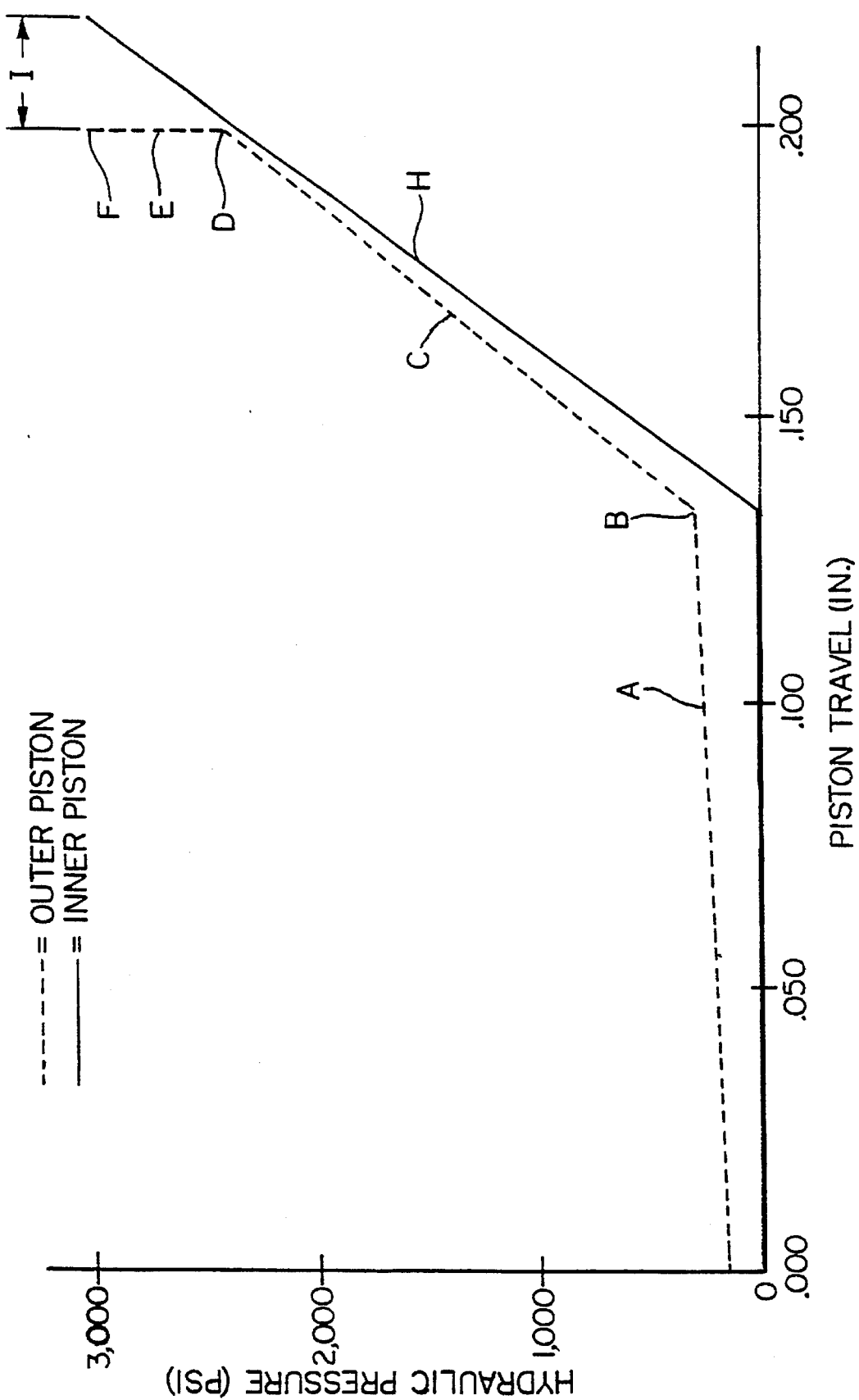
FIG. 5 is a graph illustrating piston travel relative to hydraulic brake pressure.

FIG. 5 is a graph of hydraulic pressure versus piston travel illustrative of the performance of the brake piston hydraulic adjuster assembly of the present invention. Curve A in FIG. 5 illustrates the displacement of the outer or first piston 30 during the back pressure range of the first piston whereby the clearance X is being taken up. At elbow B of curve. A, as the running clearance is being taken up, the inner or second piston 40 begins to compress the brake discs of heat stack 1. Portion C of the first piston curve represents the displacement of the outer piston after the engagement of the second or inner piston with heat stack 1, whereupon at elbow D the ends 66 and 76 of the collar member and nut means engage one another. Curve portion E represents the pressure range over which the relief valve means 34 will open at or near point F (the hydraulic pressure differential between elbow D and point F represents the increasing pressure as it approaches the valve cracking pressure), and point F of curve A represents the hydraulic pressure at which adjustment of the second piston 40 occurs relative to the first piston 30. Curve H illustrates the corresponding axial piston displacement of second piston 40 with distance I being the adjustment distance of the second piston 40 relative to first piston 30.

The brake piston hydraulic adjuster assembly of the present invention provides substantial advantages over other aircraft brake piston adjuster assemblies. The present invention does not include any permanently deforming parts and does not rely on friction loads to obtain the adjustment feature. The only tool required to reset the assembly is one necessary for opening and closing the bleeder member 55. This can be made even simpler if a miniature push-button bleeder is utilized. Additionally, when the landing gear is retracted and the worn brake oriented vertically, the static hydraulic fluid trapped in inner piston chamber 50 prevents the weight of heat stack 1 from pushing second piston 40 back into the housing 12.

I claim:

1. A brake piston adjuster assembly, comprising a housing having therein a housing bore, a first piston disposed slidably in the bore to be extendible therefrom and including a first piston bore and a first piston end, a second piston disposed slidably within the first piston bore and including a second piston bore and a second piston end, the first piston including relief valve means disposed at an inlet of the first piston end, the second piston end adjacent said inlet and the piston ends defining therebetween an inner piston chamber, and the first piston including a second end which cooperates with a portion of the adjuster assembly comprising return stroke clearance adjustment means connected with the housing, so that fluid pressure received within said housing bore displaces the first and second pistons axially outwardly of the housing bore to operate the clearance adjustment means which terminates displacement of the first piston when the running clearance is achieved, and further fluid pressure received in the housing bore causing said relief valve means to open and permit fluid flow to the inner piston chamber and effect axial displacement of the second piston relative to the first piston.

2. The brake piston adjuster assembly in accordance with claim 1, wherein the second piston end extends axially to include a bleeder member which may be opened so that fluid in the inner piston chamber may be released.

3. The brake piston adjuster assembly in accordance with claim 1, wherein the first piston end includes an axially extending portion which houses said relief valve means.

4. The brake piston adjuster assembly in accordance with claim 1, wherein the relief valve means comprises a one-way relief valve which permits fluid flow into the inner piston chamber.

5. The brake piston adjuster assembly in accordance with claim 1, wherein the housing includes a housing bushing which abuts seal means located between the bushing and a shoulder of the housing to sealingly engage the housing bore and an outer surface of the first piston.

6. The brake piston adjuster assembly in accordance with claim 1, wherein the clearance adjustment means comprises the second end engaging a collar member located at an end of said housing bore, the collar member including an axially extending first end which comprises a plurality of finger members received within circumferentially spaced apart slots in the housing, the housing including circumferentially between the slots a plurality of splines received between respective finger members of said collar member, nut means located about the collar member and engaging fixedly the housing and extending to a first end located adjacent the first end of said collar member, and resilient means located between the first ends of said nut means and collar member, displacement of the collar member compressing the resilient means until the first ends of the collar member and nut means engage one another.

7. The brake piston adjuster assembly in accordance with claim 6, wherein the resilient means comprises a disc spring.

8. The brake piston adjuster assembly in accordance with claim 7, wherein the first ends of the nut means and collar member each comprises a radially inwardly stepped portion receiving and positioning a respective portion of said disc spring.

9. The brake piston adjuster assembly in accordance with claim 6, wherein the collar member includes a radially inwardly extending portion which provides a shoulder abutted by the second end of the first piston.

10. The brake piston adjuster assembly in accordance with claim 9, wherein the housing includes an axial end portion which provides an axial stop for the radially inwardly extending portion of said collar member.

11. The brake piston adjuster assembly in accordance with claim 10, wherein the axial displacement of the first piston and collar member relative to the nut means effects an engagement of the first ends of the nut means and collar member, such axial displacement corresponding to the running clearance.

12. A brake piston adjuster assembly, comprising a housing having therein a housing bore, a first piston disposed slidably in the bore to be extendible therefrom and including a first piston bore and a first piston end, a second piston disposed slidably within the first piston bore and including a second piston bore and a second piston end, the first piston including relief valve means disposed at an inlet of the first piston end, the second piston end adjacent said inlet and the piston ends defining therebetween an inner piston chamber, and the first piston including a second end which cooperates with a portion of the adjuster assembly comprising return stroke clearance adjustment means connected with the housing, the clearance adjustment means comprising the second end engaging a collar member located at an end of said housing bore, the collar member including an axially extending first end which comprises a plurality of finger members received within circumferentially spaced apart slots in the housing, the housing including circumferentially between the slots a plurality of splines received between respective finger members of said collar member, nut means located about the collar member and engaging fixedly the housing and extending to a first end located adjacent the first end of said collar member, and resilient means located between the first ends of said nut means and collar member, the first ends of the nut means and collar member, each receiving and positioning a respective portion of said resilient means, so that fluid pressure received within said housing bore displaces the first and second pistons axially outwardly of the housing bore to operate the clearance adjustment means which terminates displacement of the first piston when the clearance is achieved, and further fluid pressure received in the housing bore causing said relief valve means to open and permit fluid flow to the inner piston chamber and effect axial displacement of the second piston relative to the first piston.

13. The brake piston adjuster assembly in accordance with claim 12, wherein the second piston end extends axially to include a bleeder member which may be opened so that fluid pressure in the inner piston chamber may be released.

14. The brake piston adjuster assembly in accordance with claim 12, wherein the first piston end includes an axially extending portion which houses said relief valve means.

15. The brake piston adjuster assembly in accordance with claim 12, wherein the relief valve means comprises a one-way relief valve which permits fluid flow into the inner piston fluid chamber.

16. The brake piston adjuster assembly in accordance with claim 12, wherein the housing includes a housing bushing which abuts seal means located between the bushing and a shoulder of the housing to sealingly engage the housing bore and an outer surface of the first piston.

17. The brake piston adjuster assembly in accordance with claim 12, wherein the collar member includes a radially inwardly extending portion which provides a shoulder abutted by the second end of the first piston.

18. The brake piston adjuster assembly in accordance with claim 17, wherein the housing includes an axial end portion which provides an axial stop for the radially inwardly extending portion of said collar member.

19. The brake piston adjuster assembly in accordance with claim 18, wherein the axial displacement of the first piston and collar member relative to the nut means effects an engagement of the first ends of the nut means and collar member, such axial displacement corresponding to the clearance.

* * * * *